United States Patent
Drechsler et al.

(12)

(10) Patent No.: US 6,375,108 B1
(45) Date of Patent: Apr. 23, 2002

(54) MULTI-LAYERED DRIVE LEADER FOR A TAPE DRIVE

(75) Inventors: Tom Drechsler, Hopkinton; Richard McGrail, Worcester; Frank Osowski, Westfield, all of MA (US)

(73) Assignee: Quantum Corporation, Milpitas, CA (US)

( * ) Notice: Subject to any disclaimer, the term of this patent is extended or adjusted under 35 U.S.C. 154(b) by 0 days.

(21) Appl. No.: 09/615,279

(22) Filed: Jul. 13, 2000

(51) Int. Cl.[7] .................................................. G03B 1/58
(52) U.S. Cl. ............... 242/332.4; 242/582; 428/694 SL
(58) Field of Search ........................... 242/332.4, 332.7, 242/348.2, 532.5, 532.7, 532.1, 582; 360/93, 95; 156/60, 313; 442/286, 287; 428/694 BB, 694 SL

(56) References Cited

U.S. PATENT DOCUMENTS

| | | | | |
|---|---|---|---|---|
| 3,179,533 A | * | 4/1965 | Rusch | |
| 3,262,812 A | * | 7/1966 | Falk | |
| 3,320,083 A | * | 5/1967 | Rusch, Jr. | |
| 4,091,168 A | * | 5/1978 | Kawamata | |
| 4,400,457 A | * | 8/1983 | Johnson | |
| 4,720,913 A | * | 1/1988 | Hertrich | |
| 5,251,090 A | * | 10/1993 | Cheatham et al. | |
| 5,971,310 A | * | 10/1999 | Saliba et al. | |
| 6,050,514 A | * | 4/2000 | Mansbridge | |
| 6,092,754 A | * | 7/2000 | Rathweg et al. | |
| 6,095,445 A | * | 8/2000 | Hentrich | |

* cited by examiner

*Primary Examiner*—William A. Rivera
(74) *Attorney, Agent, or Firm*—Steven G. Roeder

(57) ABSTRACT

A tape drive (10) adapted for use with a cartridge (22) that includes a storage tape (26) having a cartridge buckle component (56). The tape drive (10) includes a cartridge receiver (18), a take-up reel (16), a drive buckle component (54), and a drive leader (32). The drive buckle component (54) engages the cartridge buckle component (56). The drive leader (32) secures the drive buckle component (54) to the take-up reel (16). Importantly, the drive leader (32) includes a first layer (94), a second layer (96) and a third layer (98) that are secured together. Further, the second layer (96) includes a plurality of interwoven strands (102). The drive leader (32) has improved flexibility characteristics. As a result thereof, the drive leader (32) is better able to flex to conform to the tape path. This reduces the amount of wear between the drive leader (32) and the components along the tape path and reduces the amount of contamination created by the drive leader (32). Additionally, the drive leader (32) has improved strength and durability characteristics. This improves the useful life of the drive leader (32) and the reliability of the tape drive (10).

34 Claims, 3 Drawing Sheets

MULTI-LAYERED DRIVE LEADER FOR A TAPE DRIVE

FIELD OF THE INVENTION

The present invention relates generally to tape drives and cartridges that use a storage tape to store and transfer data. More specifically, the present invention relates a drive leader for a tape drive having improved strength, flexibility, and durability characteristics.

BACKGROUND

Tape drives are widely used for storing information in a digital form. These tape drives commonly use a storage tape having a thin film of magnetic material which receives the information. Typically, the storage tape is moved along a tape path between a pair of spaced apart reels, past a plurality of cores to record or read back information from the storage tape. A plurality of spaced apart, tape guides guide the storage tape along the tape path.

In one type of tape drive, one of the reels is part of the tape drive, while the other reel is part of a removable cartridge. For this type of tape drive, the reel that is a part of the tape drive is commonly referred to as a take-up reel, while the reel that is a part of the cartridge is commonly referred to as a cartridge reel. With this system, upon insertion of the cartridge into the tape drive, it is necessary to couple the storage tape on the cartridge reel to the take-up reel of the tape drive. Subsequently, the storage tape must be uncoupled from the take-up reel, prior to removing the cartridge from the tape drive.

Typically, a buckle is automatically coupled during insertion of the cartridge into the tape drive to connect a cartridge leader of the storage tape to a drive leader of the tape drive. The procedure of connecting the drive leader with the cartridge leader is commonly referred to as "buckling" or "coupling". Subsequently, during ejection of the cartridge, the cartridge leader is unbuckled from the drive leader.

Unfortunately, existing drive leaders are not completely satisfactory. In particular, the drive leader contacts a number of components, including the tape guides and the cores during movement along the tape path. Existing drive leaders are relatively rigid and react against the bending required to move along the tape path. This increases the contact force between (i) the drive leader and the tape guides and (ii) the drive leader and the cores, as the drive leader is forced to conform to the tape path. The increased contact force increases the wear on the tape guides and the cores. Further, contaminants are generated by the wear on the tape guides and the cores. The contaminants are carried along the tape path onto the cores. This influences the performance of the cores and the tape drive.

One attempt to solve this problem includes using notches and embossed areas in the drive leader to avoid direct physical contact between the drive leader and the cores. However, this solution does not address the problem of direct contact between the drive leader and the rest of the components along the tape path and the contaminants that are later transported to the cores by the drive leader. Another attempt to solve the problem includes adding a low-friction coating to reduce the static and dynamic friction coefficients of the drive leader. However, this solution is also not completely satisfactory.

Further, extended and excessive use of the tape drive can cause existing drive leaders to weaken and/or tear. This can lead to a failure of the drive leader and leader runaway. Unfortunately, the tape drive must be disassembled to replace the drive leader and/or in a leader runaway situation. This can be very expensive. Further, the tape drive can't be used until the drive leader is replaced. This can be very inconvenient to the customer because of the down time of the tape drive.

Additionally, existing drive leaders take a "set" and begin to curl after being tightly wound onto the take-up reel. Stated another way, existing drive leaders have a "memory" or the tendency to mimic the shape of the take-up reel around which the drive leader is wound. As a result thereof, additional bending of the drive leader will be required to make the drive leader conform to the tape path. This will result in increased contact force, increased wear and increased contaminants in the tape drive.

In light of the above, it is an object of the present invention to provide a drive leader that reduces the amount of contamination that is created along the tape path and subsequently dragged onto the cores. Another object of the present invention is to provide a drive leader that reduces the wear on the tape guides and the cores. Yet another object of the present invention is to provide a drive leader having increased strength, durability and flexibility. Still another object of the present invention is to provide a tape drive that is relatively easy and cost efficient to manufacture and utilize.

SUMMARY

The present invention is directed to a device and a tape drive that satisfies these objectives. The tape drive is adapted for use with a cartridge that includes a storage tape and a cartridge buckle component. The tape drive includes a cartridge receiver, a take-up reel, a drive buckle component, and a drive leader. As provided herein, the cartridge receiver receives the cartridge, the take-up reel receives the storage tape, the drive buckle component engages the cartridge buckle component, and the drive leader secures the drive buckle component to the take-up reel.

In one version of the present invention, the drive leader includes multiple layers that are secured together. For example, the drive leader can include a first layer, a second layer and a third layer that are secured together with an adhesive.

Preferably, the second layer includes a plurality of strands that are interwoven together to form a woven fabric core for the drive leader. The woven fabric core provides a tough, highly flexible center to the drive leader. The woven core is laminated on each side with the first layer and the third layer. The first and third layers cover the roughness of the woven second layer and provide the necessary stiffness to be able to feed the drive leader along the tape path.

The drive leader provided herein has much less beam strength and structural strength than previous drive leaders. As a result thereof, the drive leader readily conforms to the tape path and the drive leader smoothly tracks around the tape guides similar to the actual storage tape. Further, the drive leader does not bow and fight against deflection during movement along the tape path. This reduces the contact force between (i) the drive leader and the tape guides and (ii) the drive leader and the cores, as the drive leader conforms to the tape path. The reduced contact force minimizes the wear on the tape guides and the cores and reduces contaminants created by the wear. Further, because the drive leader has a reduced stiffness, the drive leader is less likely to scrape the tape guides and the cores.

Additionally, the woven fabric core creates a rip-stop mechanism for improved durability of the drive leader.

Stated another way, the fabric core inhibits the propagation of a tear in the drive leader.

Further, the woven fabric core creates a stress-free construction that allows drive leader to be tightly wound onto the take-up reel without the drive leader taking a "set", or a curl. As a result thereof, the drive leader remains flat when unwound after being subject to these conditions and the drive leader readily deflects to conform to the tape path.

Additionally, the present invention is directed to a method for coupling a cartridge buckle component of a cartridge to a take-up reel of a tape drive. The method includes the steps of providing a drive leader that includes a plurality of interwoven strands and securing the drive leader to the take-up reel. As provided herein, the method can also include the step of securing a drive buckle component to the drive leader.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
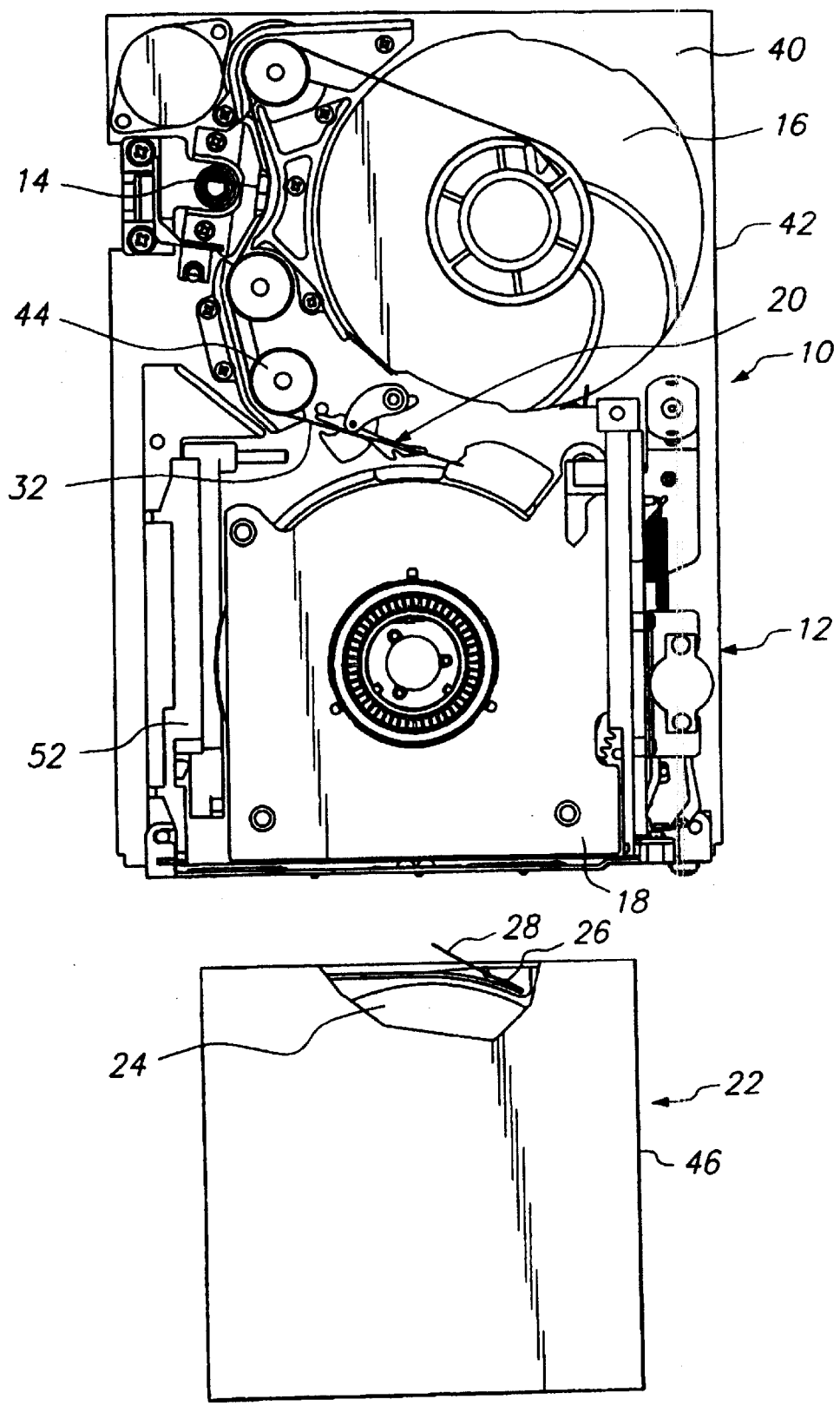
FIG. 1 is a top plan view of a portion of a tape drive and a cartridge, in partial cut-away, having features of the present invention.

Referring initially to FIG. 1, a tape drive 10 having features of the present invention includes a drive housing 12, a tape head 14, a take-up reel 16, a cartridge receiver 18, a buckler 20 and a drive leader 32. The tape drive 10 is designed for use in conjunction with a cartridge 22 including a cartridge reel 24 and a storage tape 26 having a cartridge leader 28. A buckle 30 (illustrated in FIGS. 3 and 4) secures the drive leader 32 of the tape drive 10 to the cartridge leader 28.

As provided in detail below, the drive leader 32 has improved flexibility characteristics. As a result thereof, the drive leader 32 is better able to flex to conform to the tape path. This reduces the amount of wear between the drive leader 32 and the components along the tape path and reduces the amount of contamination created by the drive leader 32. Further, the drive leader 32 has improved strength and durability characteristics. This improves the useful life of the drive leader 32 and the reliability of the tape drive 10.

Figure 2:
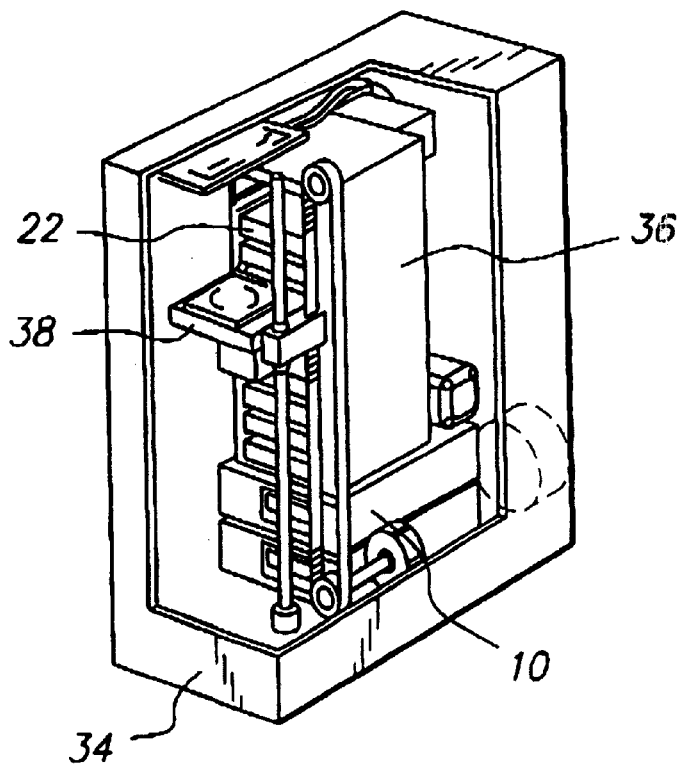
FIG. 2 is a perspective, partly cut-away view of a tape library having features of the present invention.

The tape drive 10 is typically installed within a computer (not shown), or a word processor (not shown). Alternately, referring to FIG. 2, the tape drive 10 can be utilized as part of a tape library 34. In this embodiment, the tape library 34 includes a plurality of cartridges 22 which are retained in a multiple cartridge magazine 36, a robotic cartridge handler 38 and a pair of tape drives 10. The robotic cartridge handler 38 selectively retrieves one of the cartridges 22 from the cartridge magazine 36 and places the cartridge 22 within one of the tape drives 10. A representative tape library 34 is sold under the trademark DLTstor™, by Quantum Corporation, the Assignee of the present invention.

A detailed description of the various components of a tape drive 10 is provided in U.S. Pat. No. 5,371,638, issued to Saliba, and assigned to Quantum Corporation, the Assignee of the present invention. The contents of U.S. Pat. No. 5,371,638 are incorporated herein by reference. Accordingly, only the structural aspects of the tape drive 10 which are particularly significant to the present invention are provided herein. A representative tape drive 10 is sold by Quantum Corporation, under the trademark DLT™ 4000.

The drive housing 12 retains the various components of the tape drive 10. The drive housing 12, illustrated in FIG. 1, includes a base 40, four spaced apart side walls 42 and a cover (not illustrated in FIG. 1 for clarity). The tape drive 10 includes a plurality of tape guides 44 for guiding the storage tape 26 past the tape head 14 and onto the take-up reel 16.

The tape guides 44 guide the storage tape 26 past the tape head 14 and onto the take-up reel 16. The number, design and location of the tape guides 44 can be varied to suit the design requirements of the tape drive 10. In the embodiment illustrated in the Figures, the tape drive 10 includes three, spaced apart tape guides 44 that guide the storage tape 26 along the tape path between the cartridge reel 24 and the take-up reel 16, past the tape head 14. Each tape guide 44 can include a guide body and a guide shaft. The guide body is typically cylindrically shaped and rotates about the guide shaft. The guide shaft is secured to the drive housing 12.

The tape head 14 includes one or more cores (not shown) for reading and/or recording information from the storage tape 26.

The take-up reel 16 receives the storage tape 26 during operation of the tape drive 10. Typically, the take-up reel 16 includes a hub and a pair of spaced apart flanges that guide the storage tape onto the hub. The hub can include a slot for attaching a proximal end 92 of the drive leader 32 to the take-up reel 16.

The take-up reel 16 is secured to the tape drive 10. More specifically, the take-up reel 16 is attached to a reel shaft (not shown) that rotates relative to the base 40. Rotation of the take-up reel 16 and the cartridge reel 24 results in movement of the storage tape 26 past the tape head 14.

The storage tape 26 stores data in a form that can be subsequently retrieved if necessary. A magnetic storage tape 26 is commonly used to store data in digital form. For conservation of space, the storage tape 26 has a tape width of preferably at least approximately one-half an inch (0.5 in). Alternately, for example, the storage tape 26 can have a tape width of between approximately four millimeters to eight millimeters (4.0 mm–8.0 mm). The storage tape 26 is initially retained on the cartridge reel 24 of the cartridge 22.

The cartridge 22 includes a substantially rectangular cartridge housing 46 that encloses the cartridge reel 24 and the storage tape 26. The cartridge housing 46 includes a cartridge door (not shown for clarity) which pivots between an open door position in which the cartridge leader 28 is exposed and a closed door position.

The cartridge receiver 18 is positioned within the drive housing 12 and selectively receives the cartridge 22. The cartridge receiver 18 includes a protruding wall 52 that contacts the cartridge door (not shown) of the cartridge 22 during movement of the cartridge 22 in the cartridge receiver 18. This causes the cartridge door to move from the closed door position to the open door position.

The buckle 30 secures the drive leader 32 of the tape drive 10 to the cartridge leader 28 of the cartridge 22. The buckle 30 includes a drive buckle component 54 attached to the drive leader 32 and a cartridge buckle component 56 attached to the cartridge leader 28. The design of the buckle 30 can be varied to suit the design requirements of the tape drive 10. A couple of alternate embodiments of the buckle 30 are illustrated in the FIGS. 3 and 4.

Figure 3:
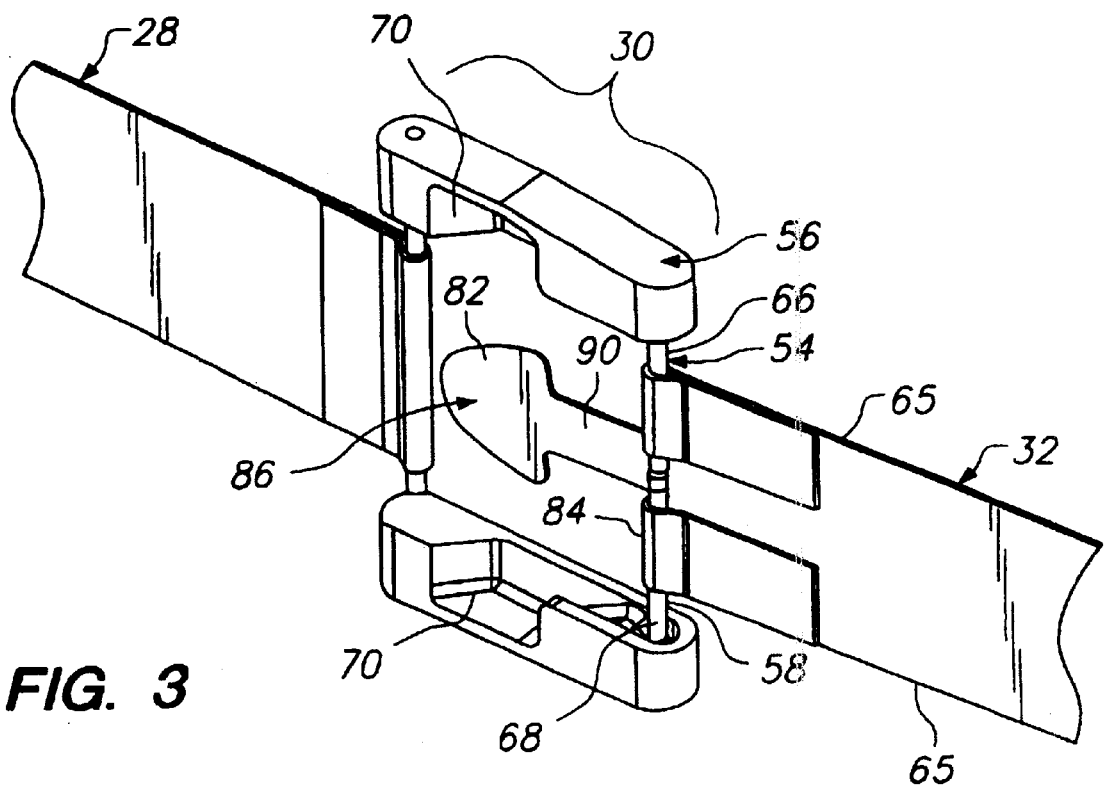
FIG. 3 is a perspective view of a drive leader, a buckle and a portion of a cartridge leader having features of the present invention.

Referring to FIG. 3, in a first embodiment of the buckle 30, the drive buckle component 54 includes a bar-shaped, buckle bar 58 that is secured to the drive leader 32. In this embodiment, the buckle bar 58 is a substantially straight piece of a rigid material, having a substantially circular cross section. The buckle bar 58 extends transversely across the drive leader 32. The buckle bar 58 includes a pair of bar ends 64 that cantilever past opposed edges 65 of the drive leader 32. Stated another way, the buckle bar 58 includes a first bar section 66 that extends away from one of the leader edges 65 and a second bar section 68 that extends away from the other leader edge 65 of the drive leader 32.

In the first embodiment of the buckle 30, the cartridge buckle component 56 includes a pair of spaced apart bar receivers 70. Each bar receiver 70 is sized and shaped to receive a portion of one of the bar sections 66, 68 to couple the drive leader 32 to the cartridge leader 28. The use of two spaced apart bar receivers 70 ensures a reliable connection between the leaders 28, 32.

Figure 4:
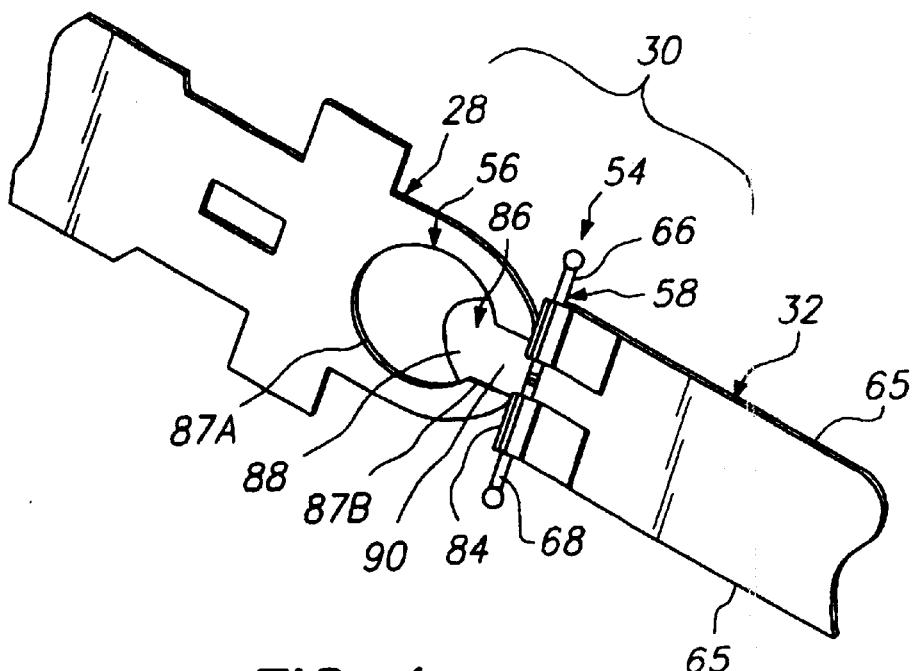
FIG. 4 is a perspective view of the drive leader, another version of the buckle and another version of a portion of a cartridge leader having features of the present invention.

FIG. 4 illustrates a second embodiment of the buckle 30. In this embodiment, the drive leader 32 includes an alternate drive buckle component 86 that projects away from a distal end 84 of the drive leader 32. In this embodiment, the alternate drive buckle component 86 is a mushroom shaped tab that is adapted to engage the cartridge buckle component 56. In this embodiment, the cartridge buckle component 56 includes a hoop 87A and a notch 87B. Thus, the alternate drive buckle component 86 allows the drive leader 32 to couple to the cartridge leader 28 that includes the hoop 87A and the notch 87B. More specifically, the alternate drive buckle component 86 includes a nose 88 that is dimensioned to fit through the hoop 87A but not the notch 87B. The alternate drive buckle component 86 also includes a neck 90 that is designed to fit in both the hoop 87A and notch 87B.

Preferably, as illustrated in FIGS. 3 and 4, the drive leader 32 includes both the drive buckle component 54 and the alternate drive buckle component 86. As illustrated in FIGS. 3 and 4, the drive buckle component 54 is typically secured to the drive leader 32 near the distal end 84 of the drive leader 32. Additionally, the alternate drive buckle component 86 and the drive leader 32 are formed as a continuous, unitary, component.

A more complete discussion of the buckles 30 illustrated in FIGS. 3 and 4 is provided in U.S. Pat. No. 5,971,310, issued to Saliba et al., the contents of which are incorporated herein by reference.

The buckler 20 moves relative to the cartridge receiver 18 to couple and uncouple the buckle 30. More specifically, the buckler 20 selectively retains and moves the drive leader 32 to couple the drive leader 32 to the cartridge leader 28. In the embodiment provided herein, the buckler 20 selectively retains the drive leader 32 at the buckle bar 58. Alternately, for example, the buckler 20 could engage an aperture (not shown) in the drive leader 32. A more complete discussion of the buckler 20 is provided in U.S. application Ser. No. 09/276,330, filed on Mar. 25, 1999, and entitled "Buckler For A Tape Drive", the contents of which are incorporated herein by reference.

The drive leader 32 extends between the take-up reel 16 and the buckle 30. More specifically, a proximal end 92 of the drive leader 32 is secured to the hub of the take-up reel 16 and the distal end 84 of the drive leader 32 is secured to the drive buckle component 54 of the buckle 30.

Figure 5:
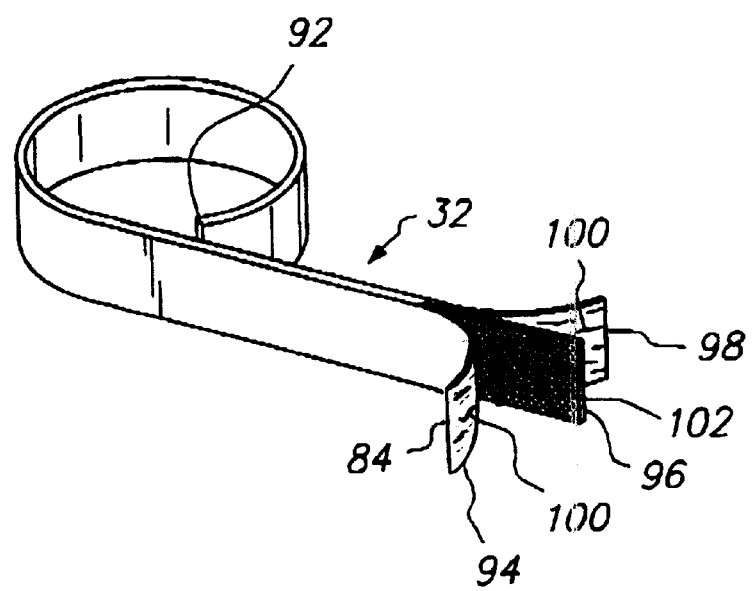
FIG. 5 is an exploded perspective view of a portion of the drive leader.

Preferably, the drive leader 32 includes multiple layers that are secured together. As illustrated in FIG. 5, the drive leader 32 can include a first layer 94, a second layer 96 and a third layer 98 that extend the length of the drive leader 32. Stated another way, each of the layers 94, 96, 98 extends substantially between the distal end 84 and the proximal end 92 of the drive leader 32. Further, the second layer 96 separates the first layer 94 from the third layer 98 and the layers 94, 96, 98 are secured together with an adhesive 100.

The material utilized for each of the layers 94, 96, 98 can be varied to suit the strength, flexibility and durability requirements of the drive leader 32. In the embodiment provided herein, each of the layers 94, 96, 98 are made of polyethylene terephthalate ("PET"). Alternately, each of the layers 94, 96, 98 could be made of another plastic, such as another type of polyester material. Still alternately, for example, each of the layers 94, 96, 98 could be made of a different material.

As provided herein, the first layer 94 and the third layer 98 are a thin, smooth, film that is made of polyethylene terephthalate. The thickness of the first layer 94 and the third layer 98 can be varied to suits the design requirements of the tape drive 10. For the embodiment provided herein, the thickness of the first layer 94 and the third layer 98 is preferably between approximately 0.2 microns and 0.8 microns and more preferably approximately 0.5 microns.

The second layer 96 is preferably made by interlacing and/or interweaving a plurality of threads or strands 102 to form a woven fabric core. In this embodiment, each of the strands 102 is made of polyester. Alternately, for example, some or all of the strands 102 can be made of other types of plastic. The thickness and width of the strands 102 can be varied to suit the design requirements of the tape drive 10. For example, a suitable second layer 96 has a thickness of approximately 0.0039 inches, and can be made of one-hundred fifty (150) denier polyester, one-hundred fifty (150) denier in both directions, sixty-eight (68) threads per inch in the warped direction and sixty-eight (68) threads per inch in the transverse direction, and a plane weave. A denier is a gram weight counted per 9,000 meters of fiber filament indicating the fineness of the fabric.

The woven fabric core 96 provides a tough, highly flexible center for the drive leader 32. With this design, the drive leader 32 has minimal beam strength or structural strength. As a result thereof, the drive leader 32 readily conforms to the tape path and the drive leader 32 smoothly tracks around the tape guides 44 similar to the actual storage tape 26. Further, the drive leader 32 does not bow and fight against deflection during movement along the tape path. This reduces the contact force between (i) the drive leader 32 and the tape guides 44 and (ii) the drive leader 32 and the tape head 14, as the drive leader 32 conforms to the tape path. The reduced contact force minimizes the wear on the tape guides 44 and the tape head 14 and reduces contaminants created by the wear. Further, because the drive leader 32 has a reduced stiffness, the drive leader 32 is less likely to scrape the tape guides 44 and the tape head 14.

Additionally, the woven fabric core 96 creates a rip-stop mechanism for improved durability. Stated another way, the fabric core 96 inhibits the propagation of a tear in the drive leader 32. Moreover, the woven fabric core 96 creates a stress-free construction that allows drive leader 32 to be tightly wound onto the take-up reel 16 without the drive leader 32 taking a "set", or a curl. As a result thereof, the drive leader 32 remains flat when unwound after being subject to these conditions and the drive leader 32 readily deflects to conform to the tape path.

Referring back to FIGS. 3 and 4, a portion of the distal end 84 of the drive leader 32 is bent around the drive buckle component 54 to secure the drive buckle component 54 to the distal end 84 of the drive leader 32. Additionally, the alternate drive buckle component 86 is integrally formed into the distal end 84 of the drive leader 32. Stated another way, the alternate drive buckle component 86 and the drive leader 32 are formed as a continuous, unitary component.

A suitable drive leader 32 can be manufactured using the following manufacturing process:

(i) providing a first layer 94 that is approximately 0.0005 inch thick (½ mil) and is made of clear PET film;

(ii) providing a second layer 96 that is woven and is made of woven PET stands 102;

(iii) bonding the first layer 94 to the second layer 96 using an adhesive 100;

(iv) curing the combination of the first layer 94, the second layer 96 and the adhesive 100 for approximately two weeks while heating and applying pressure to the combination;

(v) providing a third layer 98 that is approximately 0.0005 inch thick (½ mil) and is made of clear PET film;

(vi) bonding the third layer 98 to the second layer 96 and the first layer 94 using an adhesive 100; and (vii) curing the combination of the first layer 94, the second layer 96, the third layer 98 and the adhesive 100 for approximately two weeks while applying heat and pressure to the combinations.

With this process, the drive leader 32 has an overall thickness of 0.0049 inch. Further, the drive leader 32 is a three-layer laminate with a polyester, woven second layer 96. This second layer 96 imparts a tough highly flexible center to the drive leader 32. The second layer 96 is then laminated on both sides with the first layer 94 and the third layer 98. The first layer 94 and the third layer 98 smooth out the roughness inherent with the woven second layer 96 and provide the necessary stiffness to be able to feed the drive leader 32 through the tape drive 10.

Importantly, the multiple layer drive leader 32 has excellent flexibility characteristics. As a result thereof, the drive leader 32 is better able to flex to conform to the tape path. This reduces the amount of wear between the drive leader 32 and the components along the tape path, e.g. the tape guides 44 and the tape head 14, and reduces the amount of contamination created by the drive leader 32. Further, the drive leader 32 has excellent strength and durability characteristics. This improves the useful life of the drive leader 32 and the reliability of the tape drive 10. Stated another way, the drive leader 32 can perform over many cycles.

While the particular tape drive 12 and drive leader 32 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A device for coupling a cartridge buckle component of a cartridge to a take-up reel of a tape drive, the device comprising:

a drive buckle component that is adapted to engage the cartridge buckle component; and a drive leader that secures the drive buckle component to the take-up reel, the drive leader including a first layer and a second layer that are secured together.

2. The device of claim 1 wherein the second layer includes a plurality of interwoven strands.

3. The device of claim 2 wherein at least a portion of the strands of the second layer are made of a polyester material.

4. The device of claim 1 wherein the first layer is made of a polyester material and the second layer is made of a polyester material.

5. The device of claim 1 wherein the drive leader further comprises an adhesive for securing the first layer to the second layer.

6. The device of claim 1 wherein the drive leader includes a third layer that is secured to the second layer.

7. The device of claim 6 wherein each of the layers are made of a polyester material.

8. The device of claim 1 wherein the drive buckle component and the drive leader are formed as a continuous, unitary component.

9. The device of claim 1 wherein the drive buckle component includes a buckle bar that extends transversely across the drive leader.

10. A tape drive including (i) a cartridge receiver that is adapted to receive the cartridge, (ii) a take-up reel that is adapted to receive the storage tape, and (iii) the device of claim 1 secured to the take-up reel.

11. A tape library including the tape drive of claim 10.

12. A device for coupling a cartridge buckle component of a cartridge to a take-up reel of a tape drive, the device comprising:

a drive buckle component that is adapted to engage the cartridge buckle component; and a drive leader that secures the drive buckle component to the take-up reel, the drive leader including a plurality of interwoven strands.

13. The device of claim 12 wherein the drive leader includes a first layer and a third layer that are secured to the interwoven strands with the interwoven strands positioned between the first layer and the third layer.

14. The device of claim 13 wherein the drive leader includes an adhesive for securing the first layer and the third layer to the interwoven strands.

15. The device of claim 13 wherein the first layer, the third layer and the interwoven strands are made of a polyester material.

16. The device of claim 12 wherein the drive buckle component and the drive leader are formed as a continuous, unitary component.

17. The device of claim 12 wherein the drive buckle component includes a buckle bar that extends transversely across the drive leader.

18. A tape drive including (i) a cartridge receiver that is adapted to receive the cartridge, (ii) a take-up reel that is adapted to receive the storage tape, and (iii) the device of claim 12 secured to the take-up reel.

19. A tape library including the tape drive of claim 18.

20. A method for coupling a cartridge buckle component of a cartridge to a take-up reel of a tape drive, the method comprising the steps of:

providing a drive leader that includes a plurality of interwoven strands; and securing the drive leader to the take-up reel.

21. The method of claim 20 including the step of securing a drive buckle component to the drive leader, the drive buckle component being adapted to engage the cartridge buckle component.

22. The method of claim 20 wherein the step of providing a drive leader includes the steps of (i) securing a first layer to the interwoven strands and (ii) securing a third layer to the interwoven strands with the interwoven strands positioned between the first layer and the third layer.

23. The method of claim 22 wherein the step of securing the first layer includes the steps of heating and applying pressure to the drive leader.

24. A device for coupling a cartridge buckle component of a cartridge to a take-up reel of a tape drive, the device comprising:

a drive buckle component that is adapted to engage the cartridge buckle component; and a drive leader that secures the drive buckle component to the take-up reel, the drive leader including a plurality of strands.

25. The device of claim 24 wherein the drive leader includes a first layer and a third layer that are secured to the strands with the strands positioned between the first layer and the third layer.

26. The device of claim 25 wherein the first layer and the third layer are made of a polyester material.

27. The device of claim 24 wherein the first layer, the third layer and the strands are each made from a polyester material.

28. The device of claim 24 wherein at least a portion of the strands of the drive leader are interwoven.

29. A tape drive including a cartridge receiver that is adapted to receive the cartridge and the device of claim 24.

30. A device for coupling a cartridge buckle component of a cartridge to a tape drive, the device comprising:

a take-up reel;

a drive buckle component that is adapted to engage the cartridge buckle component, and a drive leader that secures the drive buckle component to the take-up reel, the drive leader including (i) a first layer, (ii) a second layer secured to the first layer with an adhesive material, the second layer including a plurality of strands, and (iii) a third layer secured to the second layer with the adhesive material.

31. The device of claim 30 wherein each of the layers is made from a polyester material.

32. The device of claim 30 wherein at least a portion of the strands of the second layer are interwoven.

33. The device of claim 30 wherein the drive buckle component and the drive leader are formed as a continuous, unitary component, and wherein the drive buckle component includes a buckle bar that extends transversely across the drive leader.

34. A tape drive including a cartridge receiver that is adapted to receive the cartridge and the device of claim 30.

* * * * *